No. 713,847. Patented Nov. 18, 1902.
J. H. BULLARD.
QUANTITY INDICATING DEVICE.
(Application filed Nov. 25, 1901.)
(No Model.)
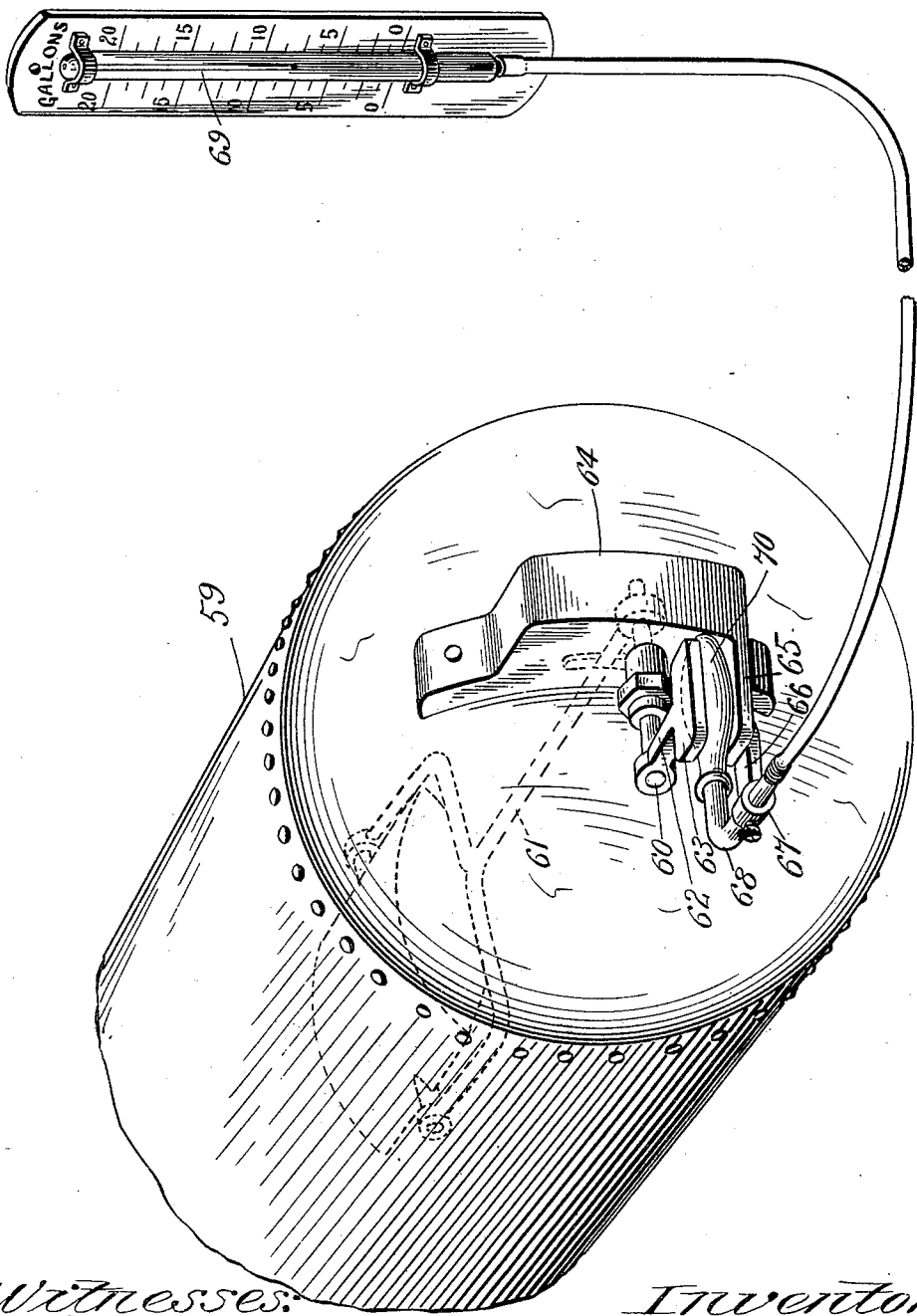
Witnesses:
Inventor

UNITED STATES PATENT OFFICE.

JAMES H. BULLARD, OF SPRINGFIELD, MASSACHUSETTS, ASSIGNOR TO THE OVERMAN AUTOMOBILE COMPANY, OF CHICOPEE, MASSACHUSETTS, A CORPORATION.

QUANTITY-INDICATING DEVICE.

SPECIFICATION forming part of Letters Patent No. 713,847, dated November 18, 1902.

Application filed November 25, 1901. Serial No. 83,592. (No model.)

*To all whom it may concern:*

Be it known that I, JAMES H. BULLARD, a citizen of the United States of America, residing at Springfield, in the county of Hampden and State of Massachusetts, have invented new and useful Improvements in Quantity-Indicating Devices, of which the following is a specification.

This invention relates to quanty-indicating devices, the object thereof being to provide improved means for indicating on a suitable gage the quantity of liquid contained at any time in a reservoir located at some distance from said gage, another object of the invention being to provide means of connection between the gage and the reservoir of such nature that said connection will be flexible and yielding in all directions and serve to operate the indicating-pointer of the gage to show variations of the quantity of the contents of the reservoir. It is immaterial whether the gage be located above or below the level of the contents of the reservoir.

The manner of constructing and of carrying my invention into practice will be fully described in the following specification and clearly pointed out in the claim.

The drawing forming part of this application consists of one figure, which shows in perspective a portion of a tank or reservoir having my invention applied thereto.

Various devices have been invented for this purpose, but in all of them mechanical means have been used for the operation of a suitable indicating-finger movable over a graduated scale for indicating the quantity of liquid in the reservoir, movement being imparted to these mechanical means by a float. It has been found, however, that these devices were not only more or less unreliable in their operation, but subject to frequent breakage or disarrangement from the fact that the vibration between the body of the vehicle, on which, necessarily, the gage must be supported, and the frame of the vehicle on which the fuel-reservoir is supported would subject said mechanical connection between the gage and the fuel-tank to such strains as would cause them to operate with difficulty or break them altogether. These disadvantages are obviated in my invention, which consists in locating a float in the reservoir, the latter being indicated by 59, and providing the float with an arm extending through a slot in the reservoir and into a hollow metal boss secured to the reservoir, through the wall of which there extends a short rotatable shaft 60, on the inner end of which the float-arm 61 is secured and on the outer end of which is secured the arm 62, having a broad flat end 63 thereon. Said shaft is provided with a suitable stuffing-box. The hollow metal boss 64 is secured to the end of the tank in such a manner as to guard against leakage. From the lower end of said boss there extends outwardly a flat shelf 65, substantially parallel with the flattened end of the arm 62, and from the under side of said shelf or other convenient point there extends a short arm 66, having a sleeve 67 thereon and provided with a set-screw. On the shelf 65 there is located between it and the flattened end of the arm 62 a small expansible and compressible bag or sack, into the open end of which there is secured a tubular member 68, which is passed through said sleeve and secured therein by the set-screw referred to. From the end of said tubular member to a gage-glass, which may be placed at any point on the vehicle convenient to the driver, there extends a flexible tubular connection. The gage consists of a glass tube 69, mounted upon a suitably-graduated plate, the lower end of said tube having attached to it said flexible connections, a small hole being left in the top of the glass to insure the free movement of liquid within it. Said compressible bag or sack (which preferably is made of rubber and is indicated by 70) and the tubular connection running to the gage-glass is filled with some suitable liquid. By means of the float and the short arm on the outside of the tank the bag 70 will as the float rises be compressed, thus forcing the liquid therein out through the flexible connection and into the gage-glass, the proportions of the device being such that when the float is at the top of the tank the column of liquid will be at the top of the gage-glass, and as the float falls, relieving said bag from pressure, the reëxpansion of the bag permits the column of liquid in the gage-glass to move down proportionately to the falling movement of the float in the reservoir. It is clear that by this construction it is possible to locate the gage-glass wherever it may be most convenient to do so, regardless of its position relative to the tank.

Having thus described my invention, what I claim, and desire to secure by Letters Patent of the United States, is—

A liquid-reservoir, a float therein, an arm on the latter extending through the wall of the reservoir, a rock-shaft with which said arm is connected and whereby it is oscillated, an arm on the rock-shaft, a fixed abutment located near said last-named arm, a compressible member on said abutment for containing a liquid, a gage, and a tubular connection between said gage and said member, whereby the movements of the arm on the rock-shaft will compress said sack and will impart movement to the liquid in said member to operate the gage, substantially as described.

JAMES H. BULLARD.

Witnesses:
K. I. CLEMONS,
W. H. CHAPIN.